United States Patent [19]

Stanner et al.

[11] Patent Number: 4,540,331

[45] Date of Patent: Sep. 10, 1985

[54] CUT OUT DEVICE

[75] Inventors: Donald Stanner, Milford, Mich.; Walton Hughes, Hendersonville, N.C.

[73] Assignee: General Motors Corporation, Detroit, Mich.

[21] Appl. No.: 524,424

[22] Filed: Aug. 18, 1983

[51] Int. Cl.³ .............................................. B25J 9/00
[52] U.S. Cl. ........................................ 414/730; 901/9; 901/29; 901/49
[58] Field of Search .................. 414/729, 730; 901/27, 901/28, 29, 41, 42, 43, 49, 11, 12, 13, 30, 9; 192/129 R, 129 A, 129 B; 200/61.39; 464/35, 36, 37, 38, 26, 24; 212/153, 154; 267/64.27

[56] References Cited

U.S. PATENT DOCUMENTS

| 3,050,598 | 8/1962 | Fennessy | 200/61.4 |
| 3,305,058 | 2/1967 | Orwin et al. | 192/56 |
| 3,608,686 | 9/1971 | Martin et al. | 192/150 |
| 3,625,328 | 12/1971 | Carli | 192/142 R |
| 3,654,412 | 4/1972 | Haruna et al. | 200/832 |
| 4,209,185 | 6/1980 | St. Clair et al. | 280/734 |
| 4,424,961 | 1/1984 | Takei | 267/64.27 |

FOREIGN PATENT DOCUMENTS

| 88559 | 9/1983 | European Pat. Off. | 901/29 |
| 2445199 | 8/1980 | France | 901/29 |
| 698905 | 11/1979 | U.S.S.R. | 212/153 |

OTHER PUBLICATIONS

Anti-Shock Clutch for a "Unimate 4000 Series" PE-4880B, General Motors.

Primary Examiner—Robert J. Spar
Assistant Examiner—Donald W. Underwood
Attorney, Agent, or Firm—Edward J. Biskup

[57] ABSTRACT

A cut out device located between the arm of a multi-axis robot and a supported work tool for disabling further movement of the arm of the robot when the work tool encounters an improperly positioned part and is constrained by such part from moving to its next programmed position.

2 Claims, 5 Drawing Figures

CUT OUT DEVICE

This invention relates to cut out devices and more particularly concerns an automatic overload cut out device which is interposed between the arm of a robot and a supported work tool.

More specifically, the cut out device, according to the present invention, includes switch means for preventing further powered movement of a work tool supported by the arm of a robot when the work tool strikes an improperly positioned part or is restrained by such part from moving to its next programmed position. In the preferred form, the cut out device comprises a first mounting plate member and a second mounting plate member which are respectively secured to the robot arm and to the work tool. A spring mechanism connects the first mounting plate member to the second mounting plate member and is located therebetween for providing a separating force between the mounting plate members that normally prevent relative movement of the mounting plate members about two control axes. The separating force is of a predetermined magnitude so when the work tool is restrained from continuing its programmed movements by an improperly positioned part, or the like, and the restraining force exceeds the separating force between the mounting plate members, the switch means provides a signal to the control system of the robot to disable the latter and thereby prevent any damage to the work tool and/or the robot.

The objects of the present invention are to provide a new and improved cut out device between the arm of a multi-axis robot and the supported work tool for disabling movement of the robot arm when the work tool collides with an improperly positioned part or is restrained from further movement by such part; to provide a new and improved cut out device which responds to an overload condition existing at the work tool supported by a robot arm to prevent further movement of the latter; to provide a new and improved cut out device interposed between the arm of a robot and a supported work tool and which causes the movement of the arm to be disabled when the work tool experiences forceful axial, torsional or sidewise movement and the applied force exceeds a predetermined magnitude; and to provide a new and improved cut out device for a robot that supports a work tool and that includes a pair of mounting plate members that are maintained in fixed relative positions by yieldable means set at a predetermined force level and are movable relative to each other when the predetermined force level is exceeded so as to provide a signal which causes the control system of the robot to cease operation thereof.

Other objects of the present invention will be apparent from the following detailed description when taken with the drawings in which.

Figure 1:
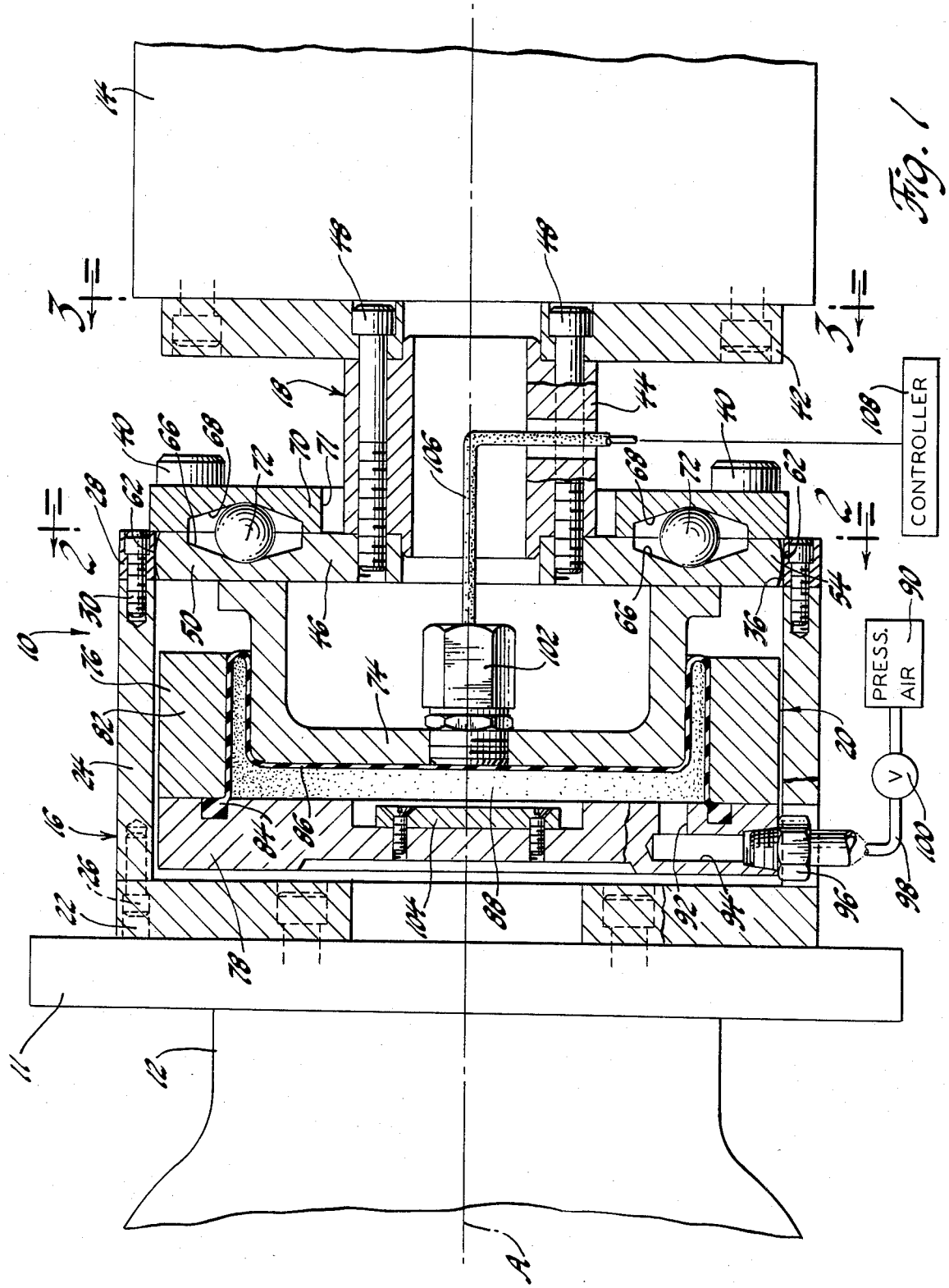
FIG. 1 is an elevational sectional view taken on line 1—1 of FIG. 3 showing a cut out device made in accordance with the present invention and interposed between the end of a robot arm and a work tool.

Referring to the drawings and more particularly to FIG. 1 thereof, a cut out device 10, according to the present invention, is shown interposed between the free end 11 of the arm 12 of a robot (not shown) and a work tool 14 such as a spot welder which can perform welding operations on an article such as an automobile body. The robot is intended to be a multi-axis robot such as shown in U.S. Pat. No. 3,984,009, dated Oct. 5, 1976, capable of providing programmed movement of the free end 11 of the arm 12 about at least four control axes one of which is shown in FIG. 1 and identified by the letter A.

In general, the cut out device 10 includes a first mounting plate member 16 and a second mounting plate member 18 interconnected by a spring mechanism 20 which serves to apply a constant separating force of a predetermined magnitude between the mounting plate members 16 and 18 as will be explained hereinafter.

Figure 2:
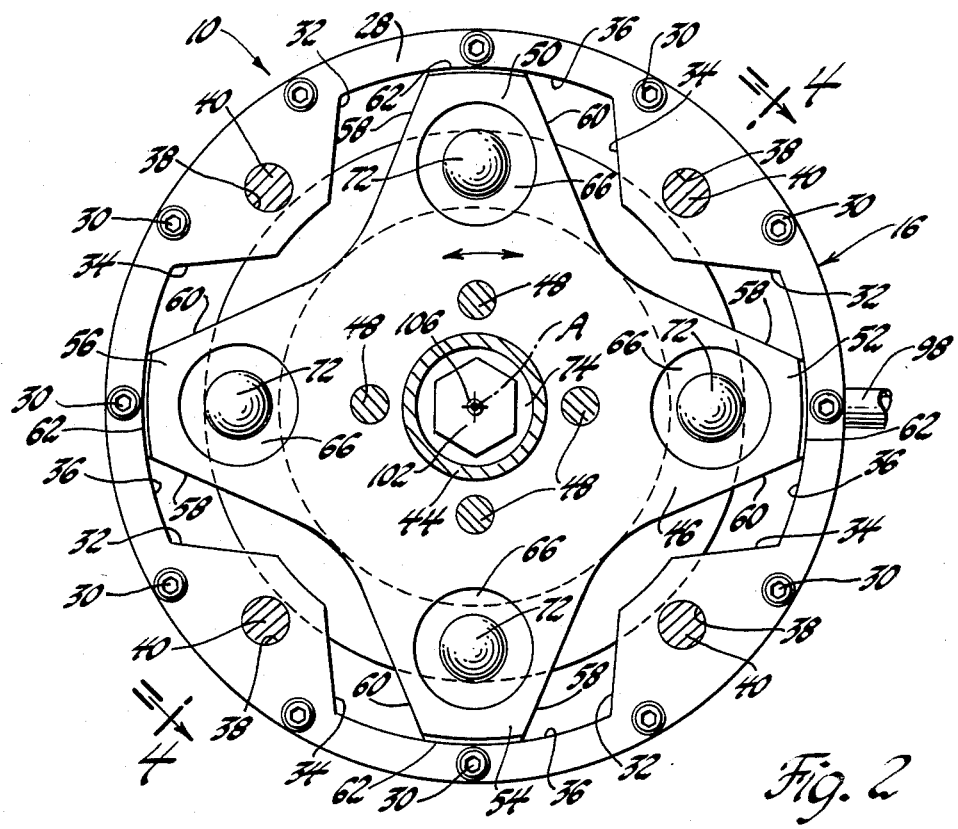
FIG. 2 is a sectional view of the cut out device taken on line 2—2 of FIG. 1.
Figure 3:
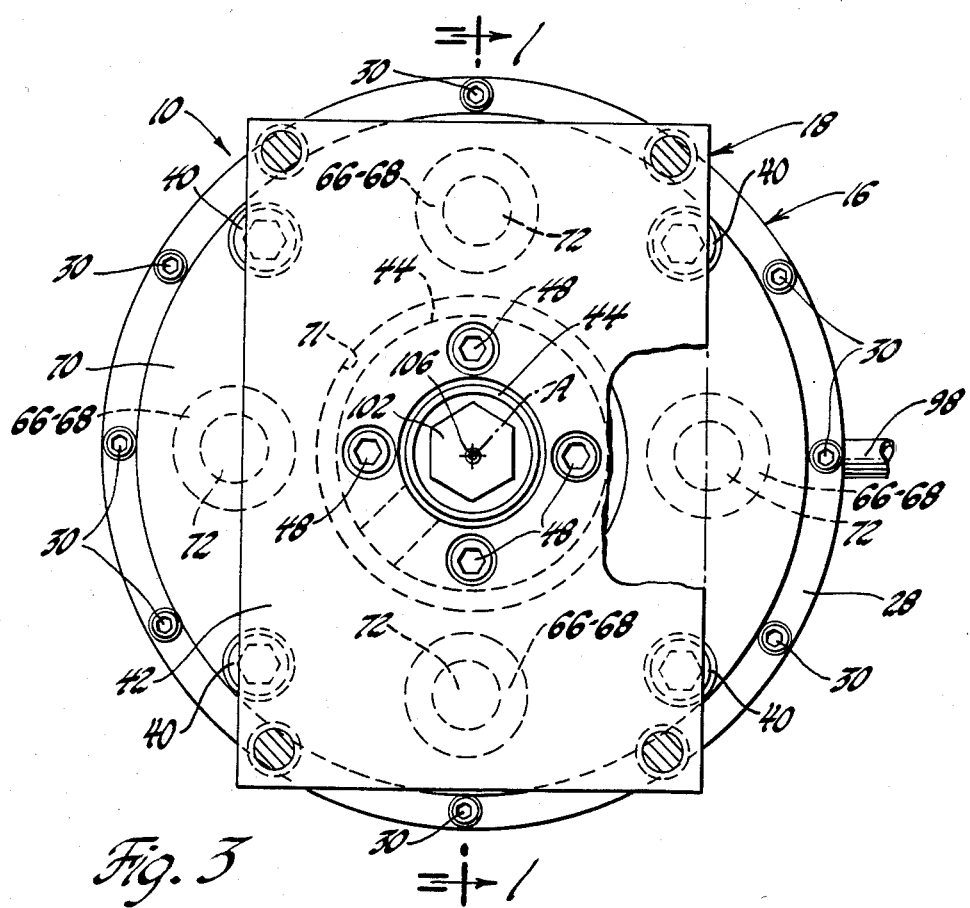
FIG. 3 is an end view of the cut out device taken on line 3—3 of FIG. 1.
Figures 4, 5:
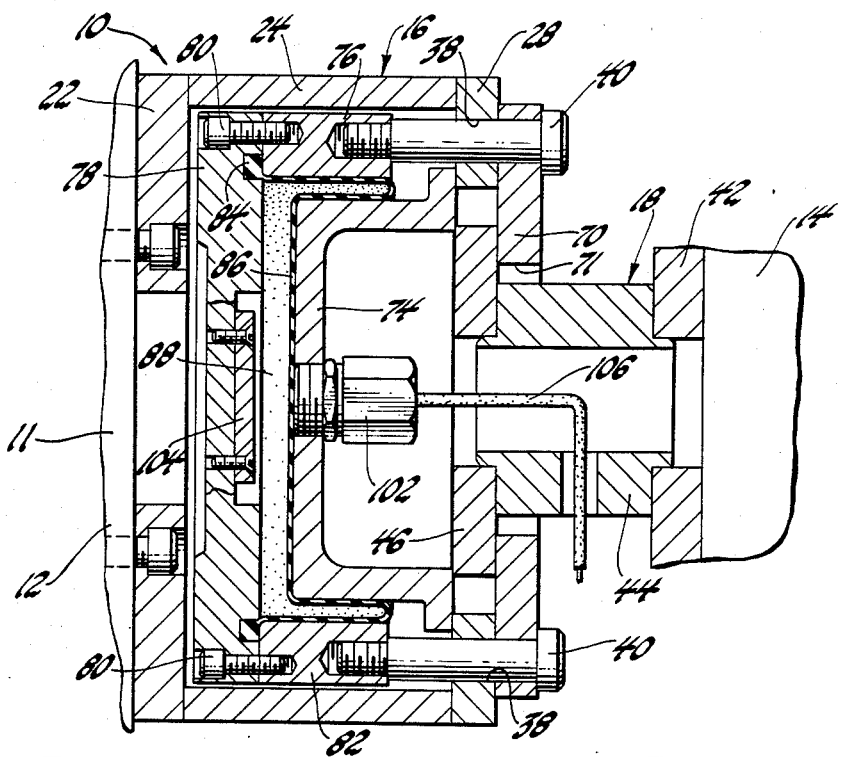
FIG. 4 is an elevational sectional view of the cut out device taken on line 4—4 of FIG. 2.
FIG. 5 is an exploded view of the cut out device showing the various parts thereof in perspective.

As seen in FIGS. 1, 4, and 5, the mounting plate member 16 comprises a circular base member 22 rigidly secured to the free end 11 of the arm 12, a cylindrical member 24 fixed to the base member 22 by a plurality of circumferentially spaced cap screws 26, and an end ring member 28 secured to the cylindrical member 24 by a plurality of set screws 30 seen in FIGS. 1, 2, and 5. The end ring member 28 is formed with two pair of diametrically opposed and radially extending guide slots each of which is defined by a pair of substantially parallel side walls 32 and 34 and a curved end wall 36. In addition, the ring member 28 is formed with four identical bores 38 each of which slidably receives the shank portion of a cap screw 40.

The other mounting plate member 18 comprises a rectangular support 42 which supports the work tool 14, a cylindrical spacer 44, and a cross member 46, all of which are rigidly interconnected to each other by four identical cap screws 48. The cross member 46 is formed with four radially extending and identical arms 50, 52, 54, and 56 each of which is normally centrally located in one of the guide slots formed in the ring member 28. Each arm 50–56 is defined by a pair of converging side walls 58 and 60 and an end wall 62 which is curved in end view seen in FIG. 2 and also in cross-section as seen in FIG. 1. In addition, the outer surface of each arm 50–56 has an identical conically shaped well 66 formed therein as seen in FIGS. 1 and 5. Each well 66 cooperates with a similar conically shaped well 68 located in a ring member 70 for housing a steel ball 72. The ring member 70 normally rests on the end ring member 28 and has a central aperture 71 formed therein through which the spacer 44 extends. The ring member 70 forms a portion of the spring mechanism 20 which also includes a primary piston 74 and a secondary piston 76. As seen in FIG. 4, the the secondary piston 76 is composed of a disc member 78 secured by cap screws 80 to a cylindrical clamping ring 82, which in turn, is connected to the ring member 70 by the screws 40, each of which is slidably carried by the associated cylindrical bore 38 formed in the end ring member 28. The clamping ring 82 cooperates with the disc member 78 for sealingly maintaining the bead portion 84 of a rolling diaphragm member 86 in fixed relationship with the secondary piston 76 while the body portion of the diaphragm member 86 partially envelopes the primary piston 74. Thus, an airtight chamber 88 is provided between the primary and secondary pistons 74 and 76 that is connected to a source 90 of pressurized air via passages 92 and 94 formed in the disc member 78, fitting 96 and an air line 98. A valve 100 is located in the air line 98 for directing pressurized air at various pressure levels into and out of the chamber as will be more fully explained hereinafter. In addition, an electric proximity switch is provided consisting of a sensor member 102 connected to the center of the piston 74 and a sensing plate 104 located in axial alignment with the sensor member 102 and centrally secured to the disc member 78. The sensing member 102 is adapted to cooperate with the sensing plate 104 for providing an output signal when the end of the sensing member 102 varies its position relative to the upper surface of the sensing plate 104. In other words, the spacial distance between the sensor member 102 and the sensing plate will be present and if such distance varies a predetermined amount, the proximity switch provides a signal via conductor 106 to the controller 108 of the robot and causes the latter to stop operating. A proximity switch of this type is manufactured by Motion Control Corporation, 23414 Industrial Park Court, Farmington, Mich. 48024 and is identified as Model #85004.

It should be apparent from the above description that the cut out device 10 is constructed so as to allow the mounting plate member 18 to be movable in and out axially relative to the mounting plate member 16 along the axis A. Also, the mounting plate member 18 is supported for limited rotary or torsional movement relative to the mounting plate member 16 about the axis A. In addition, the mounting plate member 18 can be pivoted relative to the mounting plate member 14 about axes substantially perpendicular to the axis A and passing through a point therealong. It will be understood, however, that when the chamber 88 is connected to the source of pressurized air 90 and depending upon the level of pressurization, a predetermined amount of separating force will exist between the mounting plate members 16 and 18, and it is only when such separating force is exceeded, as when a collision occurs between the work tool 14 and an improperly positioned part or if the work tool 14 is restrained from moving to its next programmed position, that one or more of the aforedescribed relative movements between the mounting plate members 16 and 18 can occur.

For example and as seen in FIGS. 1 and 4, if the robot arm 12 is moving to the right along axis A and the work tool 14 strikes an improperly positioned part with a force that exceeds the separating force provided by the spring mechanism 20, the mounting plate member 18 will move to the left causing the cross member 46 to urge the piston 74 towards the disc member 78 and, as a consequence, decrease the spacing between the end of the sensor member 102 and the sensing plate 104. This then causes a signal to be sent to the controller 108 to discontinue operation of the robot. Similarly, if the robot arm 12 is commanded to move to the left along the axis A, and the work tool 14 does not release from the article it is performing work on, the mounting plate member 18 will remain stationary while the mounting plate member 16 will begin to move to the left. This occurs because of the sliding connection between the screws 40 and the end ring member 28. Thus, as seen in FIG. 4, as the mounting plate member 16 moves to the left, the stationary cross member 46 will prevent the ring member 70 from moving and through the screws 40 also prevent the secondary piston 76 from moving relative to the mounting plate member 18. As a result and as seen in FIG. 4, leftward movement of the mounting plate member 16 causes the end ring member 28 thereof to move the primary piston 74 towards the secondary piston 76 and again decrease the spacing between the sensing plate 104 and the sensor member 102 and provide a disabling signal to the controller 108.

In addition to the relative axial movement along the axis A, if the arm 12 is rotated about the axis A and the work tool 14 resists the rotation, a condition occurs which causes relative rotary movement of the mounting plate members 16 and 18 about the axis A. In such case, the cross member 46 will remain stationary and the ring member 70 will rotate with the mounting plate member 16 above the axis A. As the ring member 70 rotates relative to the cross member 46 and because of the conical configuration of the wells 66 and 68, the balls 72 will cause a separation to occur along the A axis between the cross member 46 and the ring member 70. This, in turn, causes ring member 70 to move to the right as seen in FIG. 4 and results in the piston 76 moving towards the piston 74 to decrease the spacing between the sensor member 102 and the sensing plate 104 and again provide the disabling signal. Finally, if the work tool 14 is being moved upwardly or downwardly by the arm 12, as seen in FIG. 1, and the work tool 14 encounters a resistance of a predetermined force level, the curved end walls 62 formed on the cross member 46 will allow the mounting plate member 18 to pivot about an axis perpendicular to the axis A causing the cross member 46 to urge the piston 74 towards the piston 76. This latter movement will again result in the proximity switch providing a disabling signal to the controller 108.

Various changes and modifications can be made in this construction without departing from the spirit of the invention. Such changes and modifications are contemplated by the inventors and they do not wish to be limited except by the scope of the appended claims.

The embodiments of the invention for which an exclusive property or privilege is claimed are defined as follows:

1. A cut out device adapted to be connected to and interposed between the arm of a robot that is movable about at least two control axes and a supported work tool for preventing movement of said arm when a collision occurs between said work tool and an improperly positioned part or said arm is restrained from further movement by said part, said cut out device comprising a first mounting plate member secured to said arm, a second mounting plate member having one end thereof secured to said work tool and having the other end cooperating with said first mounting plate member to provide an enclosed space, a spring mechanism including primary and secondary piston members interconnected by a diaphragm member to form a pressurized chamber located in said enclosed space and interposed between said first mounting plate member and said second mounting plate member, said spring mechanism providing a spearating force between said first and second mounting plate members of a predetermined magnitude so as to normally prevent any relative movement between said first and second mounting plate members about said two control axes, and a proximity switch comprising a sensing plate and a sensor member connected to said primary and secondary piston members between said first and second mounting plate members for providing a signal to a control system to disable further movement of said arm when said separating force is exceeded due to said improperly positioned part and permits relative movement of said first and second mounting plate members about one of said two control axes.

2. A cut out device adapted to be connected to and interposed between the arm of a robot and a supported work tool for preventing movement of said arm when a collision occurs between said work tool and an improperly positioned part or said arm is restrained from further movement of said part, said cut out device comprising a first mounting plate member secured to said arm and formed with an enclosed space, a second mounting plate member having one end thereof secured to said work tool and having the other end rigidly connected to a cross member, a spring mechanism including primary and secondary piston members interconnected by a diaphragm to form a pressurized chamber located in said enclosed space and interposed between said first mounting plate member and said second mounting plate member, a ring member carried by said second plate member, said ring member and said cross member each having a plurality of circumferentially spaced conical cavities formed therein opposite each other, a ball located in each pair of opposed conical cavities, means connecting said ring member to said secondary piston member whereby said cross member of said second plate member and said ball in each of said pair of opposed conical cavities are held between said primary piston member and said ring member by a force of a predetermined magnitude generated by said pressurized chamber so as to normally prevent any relative movement between said first and second mounting plate members, said means cooperating with said cross member to cause relatively movement of said primary and secondary piston members when said force of a predetermined magnitude is exceeded as a result of said improperly positioned part to thereby allow torsional, axial or pivotable movement of said second plate member relative to said first plate member, and switch means operatively associated with said primary and secondary piston members for providing a signal to a control system to disable further movement of said arm when said force of a predetermined magnitude is exceeded.

* * * * *